United States Patent [19]
Pano

[11] 3,894,322
[45] July 15, 1975

[54] HOLDER WITH INTERCHANGEABLE CUTTING INSERTS FOR MACHINE TOOLS

[75] Inventor: Joseph Pano, Shavei Zion, Israel

[73] Assignee: Iscar Ltd., Nahriya, Israel

[22] Filed: Nov. 25, 1974

[21] Appl. No.: 525,214

Related U.S. Application Data

[62] Division of Ser. No. 362,861, May 22, 1973, abandoned.

[52] U.S. Cl. .................................................. 29/96
[51] Int. Cl. ............................................. B26d 1/00
[58] Field of Search ....... 29/95 R, 96, 105 R, 105 A

[56] References Cited
UNITED STATES PATENTS

| | | | |
|---|---|---|---|
| 1,144,131 | 6/1915 | Hunter | 29/105 |
| 1,843,549 | 2/1932 | Firth | 29/96 |
| 3,066,385 | 12/1962 | Vana | 29/96 |
| 3,205,557 | 9/1965 | Frommelt et al. | 29/96 |
| 3,455,001 | 7/1969 | Sirola | 29/96 |
| 3,557,417 | 1/1971 | Kollar | 29/96 |
| 3,599,303 | 8/1971 | Sletten | 29/96 |

FOREIGN PATENTS OR APPLICATIONS

| | | | |
|---|---|---|---|
| 1,002,587 | 2/1957 | Germany | 29/96 |

Primary Examiner—Harrison L. Hinson
Attorney, Agent, or Firm—J. B. Felshin; Marvin Feldman

[57] ABSTRACT

The holder has a recess at its cutting end, with a longitudinal slot extending rearwardly from the back of the recess to provide jaws, with a vertical bolt through the jaws to clamp the jaws against upper and lower end edges of a cutting insert received in said recess. Upper and lower opposed parallel, longitudinal edges of the recess are concavely shaped transversely, to slidably receive complementary transversely shaped parallel, longitudinal surfaces of the insert to prevent side movements or tilt of the insert in the tool holder. Once the insert is clamped in the tool holder, it will remain tightly clamped thereon even with substantial loads on the cutter insert and considerable vibrations. A high degree of accuracy will repeatedly occur in location of the cutter element in the tool holder. Additional advantage in clamping accuracy is provided if the cutting insert and matching nesting recess are made with concave-convex complementary sliding surfaces at the back ends of the recess and insert, as well as at the top and bottom.

10 Claims, 21 Drawing Figures

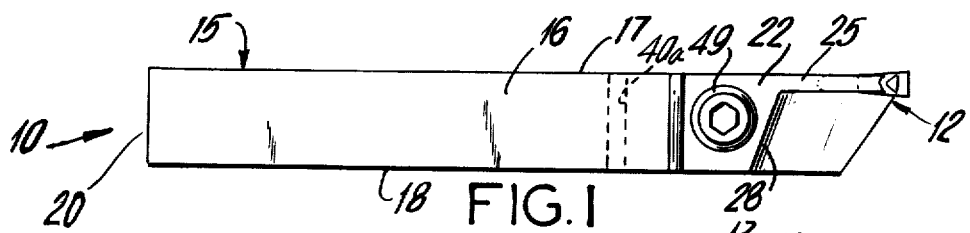
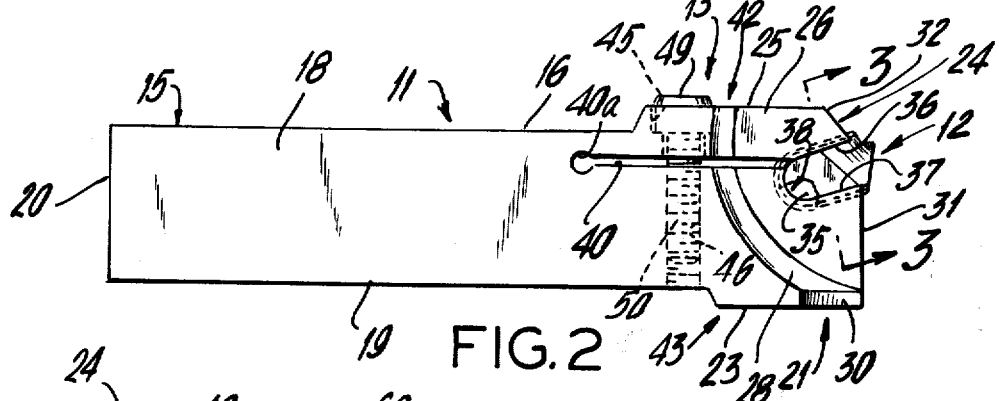
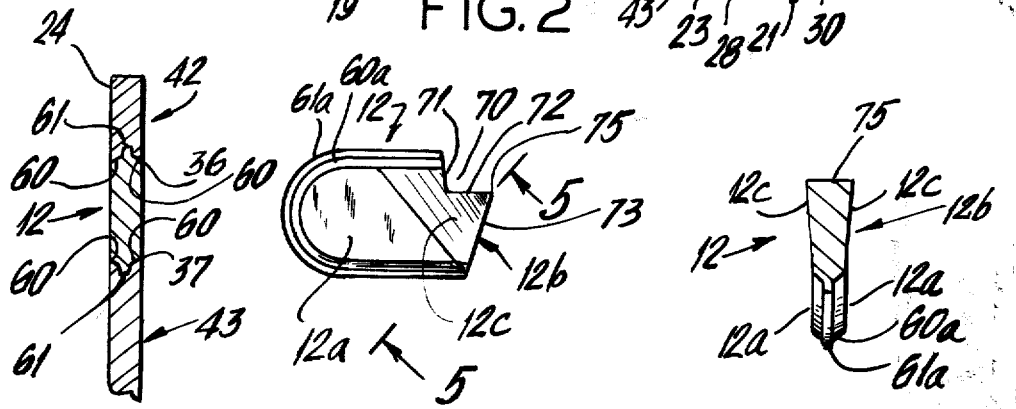
FIG.3   FIG.4   FIG.5
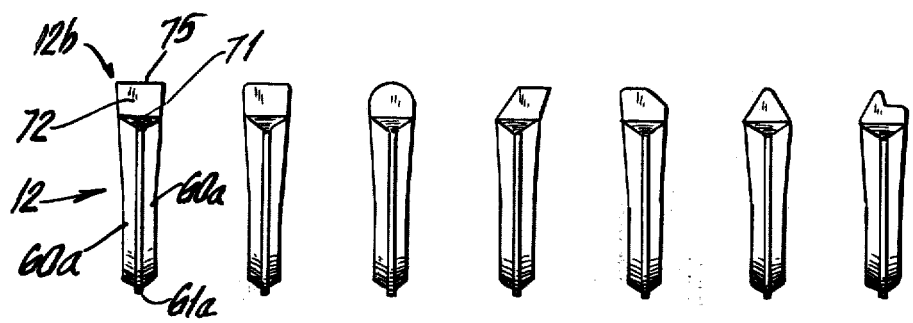
FIG.6   FIG.6b   FIG.6d   FIG.6f
FIG.6a   FIG.6c   FIG.6e

HOLDER WITH INTERCHANGEABLE CUTTING INSERTS FOR MACHINE TOOLS

This is a continuation of application Ser. No. 362,861, filed May 22, 1973, now abandoned.

This invention relates to interchangeable cutting tool inserts and cutting tool holders for use on machine tools especially applicable for parting off, slitting, recess forming, threading and profile copy turning operations.

The present invention relates to a carbide insert having a convex shape, prismatic or curved, on both base and top clamping sides, inserted into a matching next with a slit behind in a tool holder and tightened by a simple bolt at a nearby section.

A particular object of the present invention is the provision of an improved arrangement for detachably securing a narrow shaped cutter insert to a tool holder. Once the cutter element is clamped in the tool holder, it will remain tightly held thereon even in the presence of substantial loads on the cutter element and the presence of vibrations. A high degree of accuracy will repeatedly occur in location of cutter elements in tool holder.

The clamp is created by an intersecting slot through and behind the nest. Thus both base and top clamping sections remain an integral part of the whole structure of tool holder. Once cutting insert is nested and nearby bolt tightened, this feature will transmit, on opposing planes forces converging to 2 centers within the insert. These double focused clamping forces, and clamping planes being an integral part of the holder, provide a repeatedly self-centering location of insert, eliminating any possibility of side movements or tilt of the axis of cutting insert in the tool holder.

Additional advantage on clamping accuracy is provided if cutting insert and matching next are made with the same concave-convex shape at the back curved end, thus providing self-centering alignment at stop of insert's back as well. This occurs particularly if tool holder is made with a positively inclined nest.

A further object of this invention is to provide a strong, rugged and durable holder and cutter insert of the character described, which shall be relatively inexpensive to manufacture, easy to assemble and disassemble, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

In the drawings:

FIG. 1 is a top plan view of a machine tool cutter holder and insert, embodying the invention;

FIG. 2 is a front side elevational view thereof;

FIG. 3 is a cross-sectional view taken on line 3—3 of FIG. 2;

FIG. 4 is a side elevantional view of the insert of FIGS. 1, 2 and 3, apart from the holder;

FIG. 5 is a cross-sectional view taken on line 5—5 of FIG. 4;

FIG. 6 is a top edge view of the insert shown in FIGS. 4 and 5;

FIGS. 6a, 6b, 6c, 6d, 6e and 6f are views similar to FIG. 6 and showing inserts embodying the invention but having differently shaped cutting portions;

Figure 7:
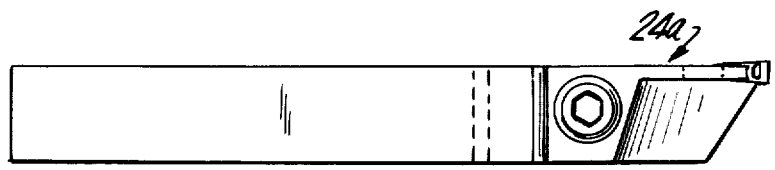
FIG. 7 is a top view of cutter holder and cutter insert, embodying the invention and illustrating a modified form of the invention.
Figure 8:
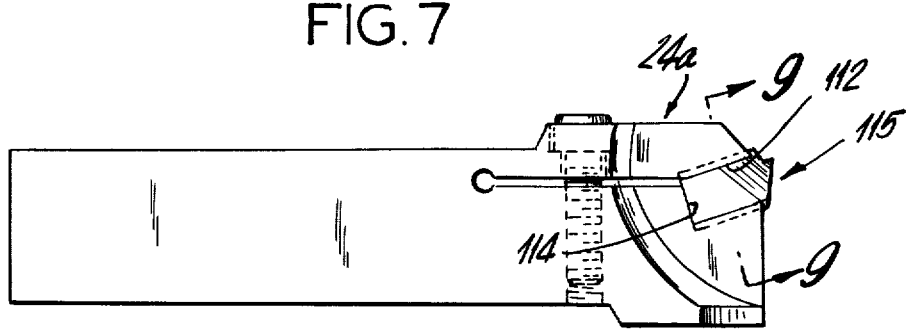
FIG. 8 is a front elevation of the structure shown in FIG. 7.
Figure 9:
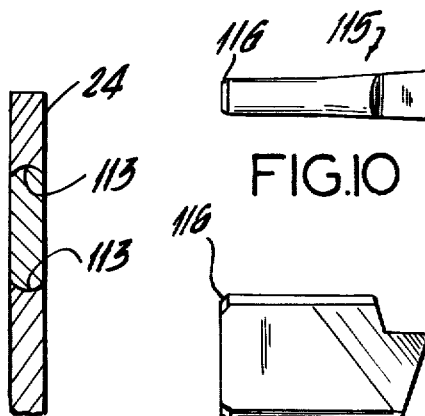
FIG. 9 is a cross-sectional view taken on line 9—9 of FIG. 8.
Figure 10:
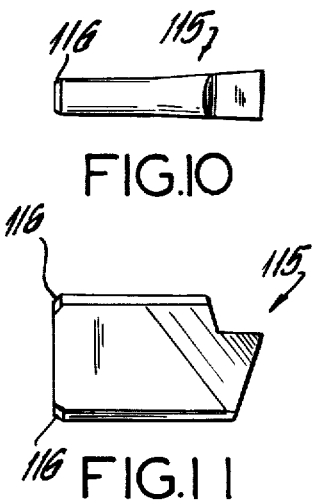
FIG. 10 is a top edge view of the insert shown in FIGS. 7, 8 and 9.
Figure 11:
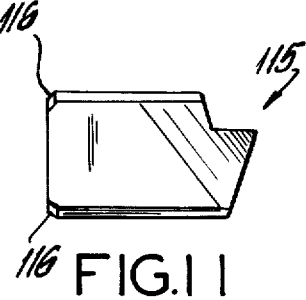
FIG. 11 is a side elevational view of the insert of FIG. 10.

Referring now in detail to the drawing and particularly to FIGS. 1 to 6 thereof, 10 designates a cutter holder and insert assembly embodying the invention. The same comprises a holder bar 11, a cutter insert 12 and a bolt 13.

The holder bar 11 comprises a shank 15 of rectangular transverse cross-section having a top surface 16, a rear side surface 17, a front side furface 18, a bottom surface 19 and a rear end surface 20. Surfaces 17 and 18 are parallel and at right angles to parallel surfaces 16, 19.

At the forward end of shank 15 is a head 21 which extends up above surface 16 to form a top surface 22, and extends down below surface 19 to form a bottom surface 23. Surfaces 22, 23 are parallel to the surfaces 16, 19. The rear surface 17 extends to the forward end of the head 21. The front side of the head is recessed rearwardly to form a narrow vertical wall 24, the rear side of which is in the plane of the forward extention of rear side surface 17. Said narrow wall 24 has a narrow upper edge surface 25 in the plane of surface 22, a front side surface 26 parallel to surface 17 and closer to surface 17 than to surface 18. Between surfaces 26 and 18 is a part frusto-conical surface 28. At the lower end of surface 28 is an inclined horizontal edge 30 extending the a front vertical edge 31 of wall 24. Extending downwardly and forwardly from the forward end of top edge 25 is an inclined edge 32.

The vertical wall 24 is formed with a forwardly opening recess 35 of U-shape, the axis of which is inclined forwardly and upwardly. Said recess or notch 35 forms an upper forwardly and upwardly inclined edge 36, a lower forwardly and upwardly inclined edge 37 parallel to edge 36, and an interconnecting semi-circular back edge 38.

The wall 24, and shank 15 are formed with a horizontal slot 40 extending from the edge 38 to a point spaced from surface 28, thus splitting the edges 36, 37, 38 into two portions, one of which is edge 36 and one part of edge 38 and the other of which is edge 37 and the other part of edge 38. The slot 40 produces at the forward end of the holder bar, two jaws which comprise an upper jaw 42 and a lower jaw 43. At the inner or rear end of slot 40 is a circular slot end 40a. The upper jaw 42 is formed, rearwardly of surface 28, with a counterbored vertical through clearance hole 45. The lower jaw 45 is formed with a vertical, tapped hole 46 coaxial with hole 45. The bolt 13 has a head 49 in the counterbore and a threaded shank 50 passing through the clearance hole in the upper jaw but engaging the threads of hole 46. Thus the bolt, when tightened, will draw the jaws together and when loosened will allow the jaws to spread, all for the purpose hereinafter explained.

The cross-sectional shape of edges 36, 37, 38 is the same all around and comprises a pair of converging grooving symmetrical dove-tailing surfaces 60 extending to a central, apex groove 61 of substantially square cross-section.

Inserted into the recess 35 (while the bolt 13 is loose) is the carbide interchangeable insert 12. Said insert 12 has generally the U-shape of the recess 35, being provided with upper and lower edges interconnected by a semi-circular back edge. The cross-sectional shape of the upper, lower and semi-circular edges is complementary to the cross-sectional shape of the edges 36, 37, 38 of the holder. Thus the insert has inclined surfaces 60a to contact the inclined surfaces 60 of the holder, and a rib 61a to be received in groove 61 of the holder. The insert 12 spans the slot 40. Its rear end 12a is as thin as wall 24 and coplanar therewith. Extending forwardly and upwardly from the thin portion 12a is a portion 12b having outwardly flaring inclined surfaces 12c. The upper corner of insert 12 is cut away as at 70 to form a chip breaker surface 71 and a surface 72 extending therefrom. Extending from the forward end of the lower edge of the insert is an upwardly inclined surface 73 meeting surface 72 in a cutting edge 75.

It will now be understood that the cutter insert is guidingly supported along its upper, lower and rear edges against side movement to withstand considerable loads and vibration. The bolt is tightened after the insert is pushed in, and the insert is held in vertical position between the opposite parallel surfaces 17, 26 of the wall 24.

FIGS. 6a, 6b, 6c, 6d, 6e and 6f show inserts which are same as the insert shown in FIG. 6, except that the shape of the cutting ends of the inserts are different as shown.

In FIGS. 7, 8, 9, 10 and 11 there is shown a modified form of the invention, same as in FIGS. 1 to 6, except that the recess or notch 112 in the wall, 24a is rectangular instead of U-shape. Also the upper and lower edges of the recess 112 have transversely curved grooves 113 and the back of the recess is straight and ungrooved as at 114.

The insert 115 has top and bottom edges complementarily shaped to be slidably received in the curved grooves 112. The rear corners 116 are beveled (or may have small radii) for clearance.

Figure 12:
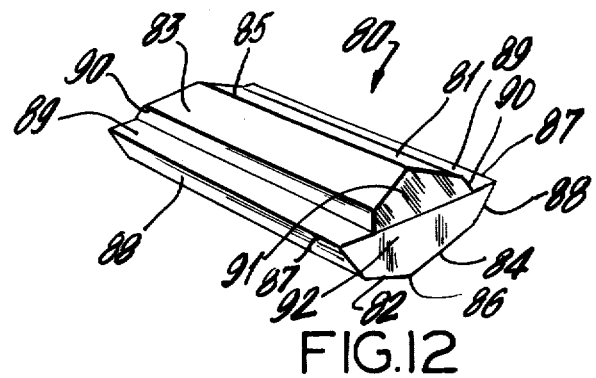
FIG. 12 is a perspective view of a modified form of cutter insert embodying the invention.
Figure 12A:
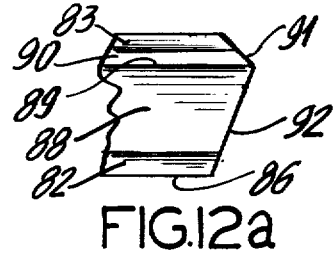
FIG. 12a is a partial side elevational view of the insert shown in FIG. 12.
Figure 13:
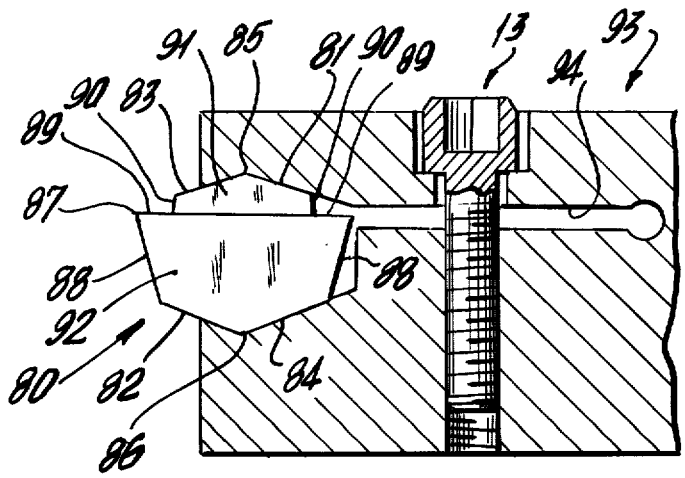
FIG. 13 is an enlarged view of a holder with cutter of FIG. 12 clamped therein.

In FIGS. 12, 12a and 13 there is shown another modified form of the invention. In said figures there is shown a cutter 80 which is a copy turning insert. Insert 80 has parallel surfaces 81, 82 and parallel surfaces 83, 84. Surfaces 81, 83 may apex at a flat or radius at 85. Surfaces 82, 84 may apex at a flat or radius 86. The cutter 80 has cutting edges 87, clearance surfaces 88, positive or negative rake surfaces 89, chip control surfaces 90, top clearance chamber surfaces 91 and frontal clearance surfaces 92.

The holder 93 shown in FIG. 13 has a slot 94 to form jaws to be clamped to the cutter 80 by bolt 13. The jaws are formed with transverse grooves forming surfaces to receive and contact and grip surfaces 81, 82, 83, 84, 88 as shown in FIG. 13.

Figure 14:
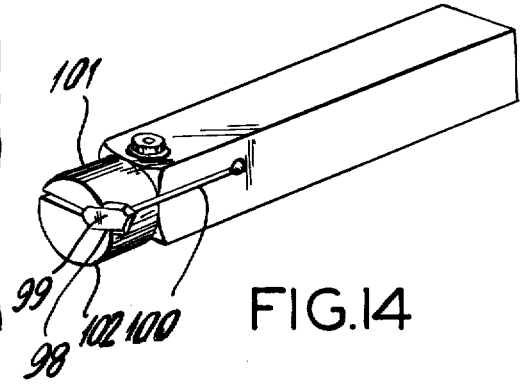
FIG. 14 is a perspective view of a cutter holder and insert illustrating another modified view of the invention.

In FIG. 14 there is shown another modified form of the invention. In FIG. 14, the recess 98 for receiving the insert 99 is in a plane transverse to the slot 100 which forms the upper and lower jaws 101, 102, respectively. The recess is also transverse to the longitudinal axis of the holder (In FIG. 1, the recess is in a plane parallel to the axis of the holder). Otherwise the recess and insert can be of the shapes shown in FIGS. 1 to 6 or in FIGS. 7 to 11.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

The holders, bolts and inserts of FIGS. 1 and 7 are the same, except for differences noted.

I claim:

1. A machine tool comprising a holder for a cutter insert, said holder comprising an elongated one piece bar having a forward end and a rear end, said bar being formed at its front end with a recess having opposite ends and being open at one end, and with a slot extending rearwardly of said recess, said slot having a closed rear end, said slot and recess forming upper and lower jaws at the front end of the bar inseparably and integrally formed with the bar, said slot being located at a level between the upper and lower edges of said recess, means located between said recess and the rear end of the slot, to press said jaws relatively together, said recess forming elongated parallel opposed edges on said jaws, a one piece cutter insert within said recess and adapted to be clamped to said holder by said press means, said insert having parallel edges slidably engaging said edges of said jaws at said recess, said edges of said jaws and insert comprising mating rail and track interengaging slidably contacting means to prevent side to side movement of said insert in a direction perpendicular to said insert, said insert having means at one end thereof to abut the other end of said recess, said bar having a vertical thinned integral wall at its forward end, said thinned wall being formed with said recess, and said insert being disposed in the plane of said thinned wall, said bar being thickened rearwardly of said thinned wall, said means to press said jaws together comprising a bolt in openings formed in said thickened portion of said bar rearwardly of said thinned wall, said bolt having an axis offset from the insert, whereby the insert and the clamping force of the bolt are in opposing planes.

2. The combination of claim 1, the back end of said recess and insert comprising edges having matching interengagement.

3. The combination of claim 1, said rail and track means of said jaws and insert comprising converging surfaces on the edges of said jaws with grooves at the apeces of said converging surfaces, and converging surfaces on the edges of said insert contacting the converging surfaces of said edges of said recess, and ribs received in the apex grooves between said converging surfaces.

4. The combination of claim 1, said insert having a portion formed with parallel, opposite surfaces, and an outwardly flaring portion formed with a cutting edge.

5. The combination of claim 1, said edges of said recess being inclined forwardly and upwardly.

6. The combination of claim 1, said recess having a semicircular back end between the rear ends of said parallel edges of said recess, said semi-circular back end having transverse grooves, and said insert having a back semi-circular edge having means to engage with the semi-circular back end of said recess.

7. The combination of claim 1, said cutter insert having a cutting edge located forwardly of the bar and above the level of said slot and below the upper surface of the bar.

8. The combination of claim 1, said insert being slidable rearwardly into said recess through the front open end of said recess.

9. The combination of claim 1, said insert being disposed in a vertical plane.

10. The combination of claim 1, said recess being in a plane perpendicular to said slot and extending longitudinally of said bar.

* * * * *